UNITED STATES PATENT OFFICE.

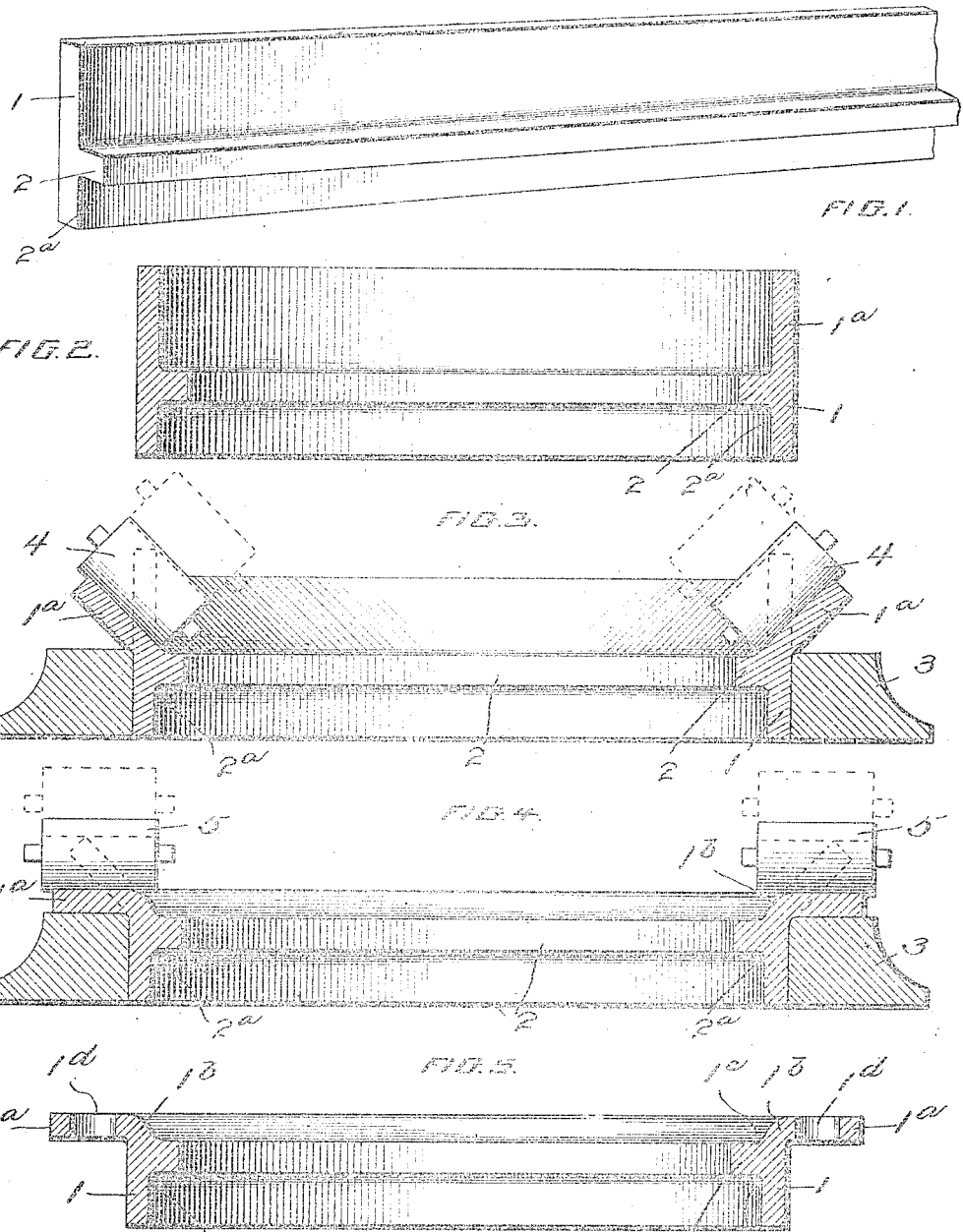

GEORGE HENRY WHITE, OF OIL CITY, PENNSYLVANIA, ASSIGNOR TO S. R. DRESSER MANUFACTURING COMPANY, OF BRADFORD, PENNSYLVANIA, A CORPORATION OF PENNSYLVANIA.

PROCESS OF MANUFACTURING CLAMPING-RINGS FOR PIPE-COUPLINGS.

1,032,718.

Specification of Letters Patent. Patented July 16, 1912.

Application filed June 7, 1910. Serial No. 565,596.

*To all whom it may concern:*

Be it known that I, GEORGE H. WHITE, citizen of the United States, residing at Oil City, in the county of Venango and State of Pennsylvania, have invented certain new and useful Improvements in Processes of Manufacturing Clamping-Rings for Pipe-Couplings; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate the manner in which my invention is carried into effect, and said invention is fully disclosed in the following description and claim.

In the said drawings, Figure 1 represents a section of the skelp which I employ in carrying out my process. Fig. 2 is a section of a ring formed by bending a piece of the said skelp into ring form and uniting the ends of the same by welding. Figs. 3 and 4 show the ring illustrated in Fig. 2, in connection with one form of apparatus for bending one end of the ring wall outwardly into a position substantially perpendicular to the axis of the ring, the ring and holding die being shown in section. Fig. 5 shows in section the finished ring. Fig. 6 is a sectional view of a slight modification of the ring.

The object of my invention is to provide a process for the manufacture of clamping rings for pipe couplings, from wrought metal, such as steel or wrought iron, whereby the same may be manufactured commercially, in large quantities, expeditiously and at such moderate expense as to enable them to replace in the trade rings of this character heretofore made from cast or malleable cast iron.

In carrying out this invention I first prepare a skelp or blank, as illustrated in Fig. 1, which comprises a flat plate 1, which is provided on one face with a longitudinally disposed projecting rib 2, located at a distance from one edge of the plate portion equal to the depth of the packing recess desired in the finished ring, as indicated at 2ª.

The skelp is preferably rolled in lengths sufficient for a number of blanks. A piece of this skelp is cut off of such length that when it is bent into ring form, and the ends united, the diameter of the ring at the inner edge of the rib 2, will accommodate a pipe of given diameter. The blank so formed by severing a piece of the skelp of the desired length is then bent into ring form, by any suitable bending means with the rib 2 on the inside, and the ends are united by welding.

In severing the blank from the skelp the ends thereof may be so cut as to make a lap weld or a butt weld, and the welding may be done by fire heat and the use of a hammer or dies, or the ring may be welded electrically, as preferred. In any case care should be taken that in the welding operation the continuity of the rib 2 shall be preserved. I find it convenient in carrying out this step of my process to heat the meeting ends of the blank in a gas furnace and to hammer weld them by means of a hammer and anvil or peg such as are shown in my former Patent No. 863,477 dated August 13, 1907 the peg in this instance being specially constructed to preserve the form and continuity of the rib 2 and the lateral edges of the plate portion 1 of the skelp. The ring thus far formed will be of cylindrical shape, as indicated in Fig. 2, with the rib projecting inwardly from its inner face. The next step in my process consists in bending the longer portion of the ring wall, on one side of the rib 2, outwardly until it is in a position substantially perpendicular to the axis of the ring. This step must be performed in such a way as to avoid tearing or splitting the metal, which obviously must be expanded considerably more at its outer extremities than it is adjacent to the rib, and provision must be made for preventing any distortion of the other end of the cylindrical ring during this step. In the drawing I have shown one form of apparatus for forming one end of the ring into a substantially perpendicular flange which consists of a holding die 3, of an internal diameter suitable for receiving and holding the portion of the ring which is to be retained in shape, and of such a height as to have its top face nearly in line with the lateral face of the rib 2, nearest to the line of bend to be made. The ring preferably in a highly heated condition, is placed in the holding or retaining die 3, and the exposed part of the ring is operated upon from the inside outwardly by a roller 4, or rollers 4, 4. The roller 4, or rollers 4, 4 is or are preferably carried in supporting means, capable of movement outwardly and downwardly with respect to the die 3, and I prefer to provide for a relative rotary movement of the die and rollers, with respect to each other, either by supporting the die on a rotary bed, to which motion is imparted or by supporting the roller, or rollers in a rotary part, as preferred. The effect of the operation of the parts just described, is to bend the entire ring wall above the rib 3, outwardly, as shown in Fig. 3 at 1ª.

In order to flatten the outwardly bent portions 1ª into position shown in Fig. 4 substantially perpendicular to the axis of the ring, I may use the same retaining die 3, or another similar die having its top face in a slightly higher plane, and a roller or rollers 5, 5 having their axes substantially perpendicular to the axis of the ring as shown in Fig. 4, and capable of vertical movement with respect to the die. I also prefer to provide means for establishing relative rotary movement between the flattening roll or rollers, and the retaining die. The effect of the operation of the parts shown in Fig. 4 is to roll down the end portion of the ring into a position substantially perpendicular to the axis of the ring, thus forming an outwardly projecting annular flange 1ª, the lower face of which is in substantial alinement with the upper face of the rib 2, see Figs. 4 and 5. In other words the outer flange 1ª is stepped with respect to the rib 2, to afford the requisite metal for the bend, at 1ᵇ without distorting the rib, and thus produces a shallow recess 1ᶜ on the outer side of the rib. The ring is completed by providing the projecting flange 1ª with bolt holes 1ᵈ at suitable intervals around the same, which may be formed by punching (preferably by cold punching) or in any other suitable manner. The ring thus formed provides a plate member (represented by the flange portion 1ª) disposed substantially perpendicularly to the axis of the ring, an annular flange member, represented by the cylindrical body portion 1 of the ring, extending from one face of the plate member, and having an inwardly projecting annular flange (represented by the rib 2) which is out of alinement with the plate member, and forming a packing recess 2ª on the side of the rib 2, opposite the plate member.

I do not limit myself to the use of the apparatus herein described in carrying out my process, as I may employ other means than those referred to for carrying out the steps thereof. It will be seen that the wrought metal ring produced by this process, possesses great strength to resist distortion under the stress of the clamping bolts 1ᵈ as the offset or stepped relation of the plate member 1ª with respect to the bead 2, forming the packing recess provides a larger body of metal to resist the resulting strain produced on the ring by the tension of the bolts, and the resistance sustained by the rib 2 of the packing recess.

It is to be understood that I may provide means for standardizing and truing the portion of the ring which comes nearest the pipe, to wit, the inner face of the rib 2, and the annular flange portion 1. I prefer to perform this step of standardizing and truing before the bending of the end portion of the ring perpendicular to the axis thereof, and to retain the lower end of the same which forms the packing recess, in its true form during the formation of the plate member 1ª. I may, however, perform this step after the formation of the plate member 1ª and at the same time, or before or after the bolt holes are made, as may be found most convenient. This step is performed by means of suitable dies, or by a holding die and an expanding mandrel engaging the lower end of the ring wall, and the rib portion 2 thereof, as will be readily understood, without particularly illustrating this step. In some instances I further treat the ring by bending the outer marginal portions of the plate member 1ª to form an external reinforcing flange 1, as clearly shown in Fig. 6. This external flange will strengthen and reinforce the plate member of the ring, and render the whole ring stiffer to resist the tension of the bolts.

The ring *per se* as an article of manufacture is not specifically claimed herein as it forms the subject matter of a divisional application filed by me on the 2nd day of November 1910, Serial No. 590,397.

What I claim and desire to secure by Letters Patent is:—

The herein described process of forming a clamping ring for pipe couplings, provided with an annular plate member, an annular flange projecting from one face thereof and an inwardly extending annular flange forming therewith an annular packing recess, which consists in forming a blank comprising a flat plate, having a longitudinal rib projecting from one face, of sufficient thickness and depth to form the base of the packing recess, said rib being located at a distance from one edge of the plate equal to the depth of the desired packing recess, and at a distance from the other edge substantially equal to the width of the plate member, bending said blank into a circle with the rib inside and welding the ends together, to secure continuity of the plate and of the rib, and bending the plate member portion of the ring so formed bodily outward into a plane substantially perpendicular to the axis of the ring, imparting to the other end portion of the ring and to the inner edge of the rib true circular form of predetermined internal diameters, and forming bolt holes in the outwardly bent plate member portion.

In testimony whereof I affix my signature, in the presence of two witnesses.

GEORGE HENRY WHITE.

Witnesses:
BERNARD FLANNIGAN,
CHAS. R. BAKER.